July 12, 1955  M. W. HUBER  2,712,954
SANDER CONTROL MEANS
Filed June 30, 1952
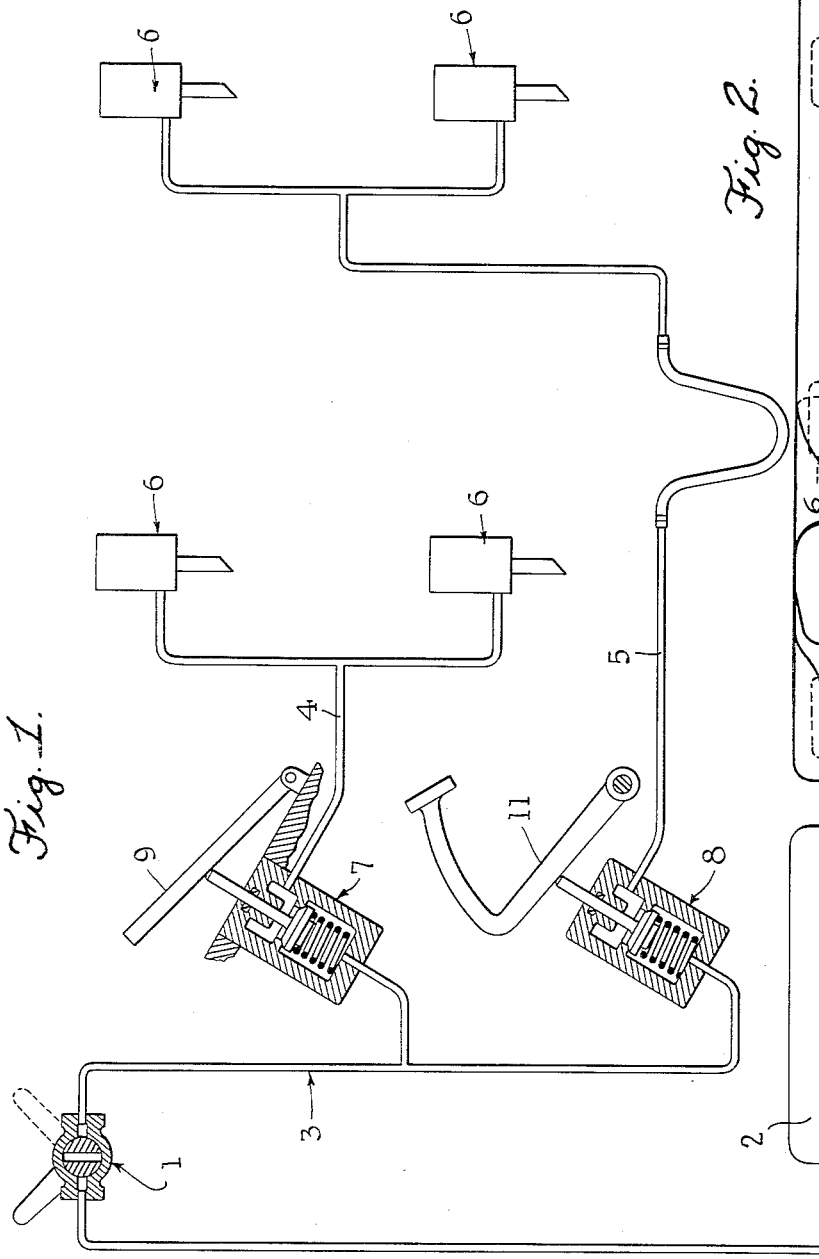
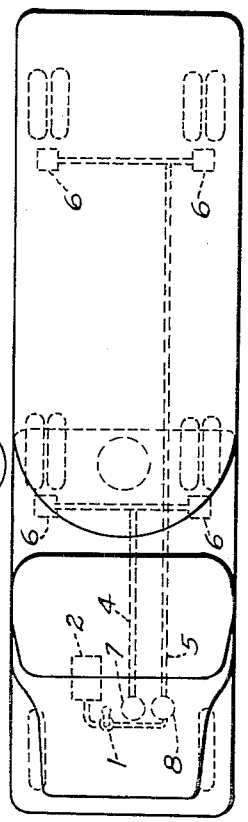
INVENTOR
Matthew W. Huber
BY
ATTORNEYS United States Patent Office 2,712,954
Patented July 12, 1955

2,712,954

SANDER CONTROL MEANS

Matthew W. Huber, Watertown, N. Y., assignor to The New York Air Brake Company, a corporation of New Jersey Application June 30, 1952, Serial No. 296,441

4 Claims. (Cl. 291—2)

This invention relates to control means for sanding equipment. Specifically it relates to control means especially for use on articulated land vehicles such as the familiar tractor trailer truck.

The control means are so arranged that sand is delivered to either of two locations depending upon whether the vehicle is being accelerated or decelerated. Tractor trailer units are afflicted by the ever present danger of "jackknifing." According to the present invention the likelihood of "jackknifing" is reduced during stopping of the vehicle, because the sand is delivered only to the rear wheels of the trailing unit.

The apparatus comprises a main sanding control valve which may be operated to supply motive fluid to the sanding system. Sanders are located on the tractor and trailer units respectively. Sanding connections extend between the main sanding control valve and those sanders which are located on the tractor unit and those which are located on the trailer unit. These supply connections are arranged in parallel flow relation. The flow through each of the supply connections is controlled by a normally closed valve. These normally closed valves may be selectively opened so that the sand may be applied either beneath the wheels of the tractor unit so as to increase the adhesion during acceleration of the vehicle or beneath the wheels of the trailer unit to increase the adhesion between the wheels and the road when the vehicle is being braked or decelerated.

The valves on the tractor and trailer units are desirably controlled by depression of the accelerator pedal and the brake pedal respectively.

The invention will be described having reference to the accompanying drawing in which:

Figure 1 is a piping diagram of the equipment arranged according to the present invention.

Figure 2 is a schematic top plan view showing this equipment on a tractor-trailer unit.

A main sanding control valve 1 controls the flow of pressure fluid from a supply reservoir 2 to the main sander delivery connection 3. Connected to the main delivery connection 3 are the supply connections 4 and 5 for the sanders on the tractor and trailer units respectively. These sander units are conventional and are indicated by the reference numeral 6.

Interposed in each of the supply connections 4 and 5 are normally closed check valves 7 and 8 respectively. The check valve 7 which controls the flow of pressure fluid to the sanders on the tractor unit is arranged so as to be opened when the accelerator pedal 9 is depressed. The check valve 8 in the supply connection on the sander unit is arranged so as to be opened when the brake pedal 11 is depressed.

During operation of the vehicle, if sanding is desired, the main sanding control valve 1 is opened thus admitting pressure fluid to the main delivery connection 3. The opening of the sanding valve 1 initiates sanding on either the tractor or trailer unit depending upon whether the accelerator 9 or the brake pedal 11 is depressed. It will be obvious that this selective delivery of the sand results in a reduction of the likelihood of "jackknifing" the unit while it is being braked to a stop and eliminates the wasting of sand when it is desired to sand for tractive purposes. The normally closed valves 7 and 8 can be manually controlled, however the illustrated arrangement is preferred, because the proper delivery of sand is automatically selected by operation of the vehicle in the normal way.

It will be apparent that while the main sanding control valve is shown as a simple two position cock, it could be any commercial control valve.

What is claimed is:

1. In sanding control equipment for an articulated land vehicle, the combination of a main sanding control valve; sander units on the lead unit of said vehicle and on the trailing unit; an independent delivery connection between said control valve and the sanders on the lead and trailing units respectively; a normally closed valve in each of said connections; and means to open said normally closed valves selectively during the operation of said vehicle.

2. The combination defined in claim 1 in which the means to open the valve in the delivery connection to the sanders on said trailing unit comprises the brake applying means of said vehicle, said valve being opened when the brakes are applied.

3. The combination defined in claim 1 in which the means to open the valve in the delivery connection to the sanders on the lead unit comprises the engine throttle of said vehicle, this valve being opened when the throttle is opened and the means to open the valve in the delivery connection to the sanders on the trailing unit comprises the brake applying means of said vehicle, said valve being opened when the brakes are applied.

4. For use on an articulated wheeled tractor-trailer road vehicle, the combination of selectively manipulable control means to actuate the propulsive means of the tractor, and to actuate brakes at least some of which brake trailer wheels; independently operable road sanding means for tractor wheels; independently operable road sanding means for trailer wheels; actuating means for the tractor sanding means rendered effective to actuate the tractor sanding means by operation of said control means to actuate the propulsive means; and actuating means for the trailer sanding means rendered effective to actuate the trailer sanding means by operation of said control means to actuate the brakes.

References Cited in the file of this patent

UNITED STATES PATENTS

| 1,360,746 | Hellmund | Nov. 30, 1920 |
| 1,955,307 | Morrison et al. | Apr. 17, 1934 |
| 1,995,249 | Hessler | Mar. 19, 1935 |
| 2,099,283 | Stevenson | Nov. 16, 1937 |
| 2,625,417 | Sundheim | Jan. 13, 1953 |